United States Patent
Neroni

(10) Patent No.: US 8,900,386 B2
(45) Date of Patent: Dec. 2, 2014

(54) TYRE RETREADING METHOD AND SYSTEM

(75) Inventor: Simone Neroni, Rome (IT)

(73) Assignee: Bridgestone Corporation, Tokyo (JP)

( * ) Notice: Subject to any disclaimer, the term of this patent is extended or adjusted under 35 U.S.C. 154(b) by 324 days.

(21) Appl. No.: 13/128,780

(22) PCT Filed: Nov. 12, 2009

(86) PCT No.: PCT/EP2009/065079
§ 371 (c)(1),
(2), (4) Date: Aug. 1, 2011

(87) PCT Pub. No.: WO2010/055110
PCT Pub. Date: May 20, 2010

(65) Prior Publication Data
US 2011/0272084 A1  Nov. 10, 2011

(30) Foreign Application Priority Data

Nov. 12, 2008  (IT) ............... TO2008A0830

(51) Int. Cl.
*B29D 30/56* (2006.01)

(52) U.S. Cl.
CPC ................ *B29D 30/56* (2013.01)
USPC ........... 156/96; 152/209.6; 156/129; 156/130

(58) Field of Classification Search
USPC ................ 156/96, 127, 129, 130; 152/209.6, 152/154.2
See application file for complete search history.

(56) References Cited

U.S. PATENT DOCUMENTS

| | | | | |
|---|---|---|---|---|
| 3,236,709 A | * | 2/1966 | Roy | 156/96 |
| 3,516,467 A | * | 6/1970 | Sims | 152/154.2 |
| 3,814,160 A | * | 6/1974 | Creasey | 152/154.2 |
| 3,945,871 A | * | 3/1976 | Schelkmann | 156/212 |
| 4,698,245 A | | 10/1987 | Schallmeier et al. | |
| 4,934,426 A | | 6/1990 | Remond et al. | |
| 5,162,070 A | * | 11/1992 | Meyer | 156/500 |
| 5,277,727 A | | 1/1994 | Seiler et al. | |
| 5,635,015 A | | 6/1997 | Longo et al. | |
| 6,368,439 B1 | | 4/2002 | Bender et al. | |
| 2005/0211351 A1 | * | 9/2005 | Majumdar et al. | 152/154.2 |

FOREIGN PATENT DOCUMENTS

EP           0 715 948 A1   6/1996
WO       WO-98/03358 A1 *  1/1998

* cited by examiner

*Primary Examiner* — Geoffrey L Knable
(74) *Attorney, Agent, or Firm* — Sughrue Mion, PLLC

(57) ABSTRACT

A method and system for retreading a tire; the method including the steps of: removing the worn tread from the tire; winding a green-rubber cushion about the tire; forming at least one longitudinal groove in an inner surface of a tread strip; applying to the inner surface of the tread strip a green-rubber strip which is inserted inside the longitudinal groove to fill the longitudinal groove; winding the tread strip about the tire and on top of the green-rubber cushion; and curing the tire fitted with the green-rubber cushion and the tread strip.

11 Claims, 2 Drawing Sheets

TYRE RETREADING METHOD AND SYSTEM

CROSS REFERENCE TO RELATED APPLICATIONS

This application is a National Stage of International Application No. PCT/EP2009/065079 filed Nov. 12, 2009, claiming priority based on Italian Patent Application No. TO2008A000830 filed Nov. 12, 2008, the contents of all of which are incorporated herein by reference in their entirety.

TECHNICAL FIELD

The present invention relates to a tyre retreading method and system.

The present invention may be used to advantage in cold retreading truck tyres, to which the following description refers purely by way of example.

BACKGROUND ART

Cold retreading a truck tyre normally comprises removing the worn tread from the tyre, and applying a new tread to the tyre casing. Applying a new tread to the casing comprises winding a green-rubber intermediate strip or cushion and a precured tread strip (PCT) about the casing; and the casing is further cured in a curing vessel to achieve firm grip of the tread to the casing through the binding action of the cushion.

One example of a precured tread strip ready for application to a tyre casing is described in U.S. Pat. No. 5,277,727A1; and one example of a cold tyre retreading station implementing the above method is described in U.S. Pat. No. 6,368,439B1.

Before winding on the precured tread strip, the outer surface of the previously applied cushion is sprayed with a green-rubber and normalheptane (or other organic solvent) liquid (known as cement) to grip the tread strip to the green-rubber cushion and prevent detachment of the tread strip from the green-rubber cushion when winding the tread strip about the casing.

Cementing, however, has several drawbacks. Cement being volatile and potentially highly contaminating, it must be applied in a cementing booth, which is bulky, expensive, and normally insulated with rock wool (which is expensive to dispose of). Moreover, cement is stored in drums, which are also expensive to dispose of; the presence of cement between the cushion and tread strip, i.e. of a heterogeneous material interposed between two rubber layers, may impair performance of the retreaded tyre; and, given the highly contaminating nature of the organic solvents in cement, avoiding the use of organic-solvent-based cement would greatly reduce the overall environmental impact of the tyre retreading process. In this connection, it is important to note that a recent European Union directive (VOC 13/1999/EC) calls for a 75% reduction in the use of organic solvents in industrial processes by the year 2007.

U.S. Pat. No. 5,635,015A1 describes a tyre retreading method in which, to avoid using cement, the green-rubber cushion is heated before being wound about the tyre. Heating the green-rubber cushion should improve its grip sufficiently to avoid using cement, but has been found to also soften it, thus making it more difficult to wind about the tyre. Moreover, the improvement in grip of the green-rubber cushion by heating it is not always sufficient to prevent detachment of the tread strip from the green-rubber cushion when winding the tread strip about the tyre.

DESCRIPTION OF THE INVENTION

It is an object of the present invention to provide a tyre retreading method and system designed to eliminate the above drawbacks, and which are cheap and easy to implement.

According to the present invention, there are provided a tyre retreading method and system as claimed in the accompanying Claims.

BRIEF DESCRIPTION OF THE DRAWINGS

A non-limiting embodiment of the present invention will be described by way of example with reference to the accompanying drawings, in which.

PREFERRED EMBODIMENTS OF THE INVENTION

Figure 1:
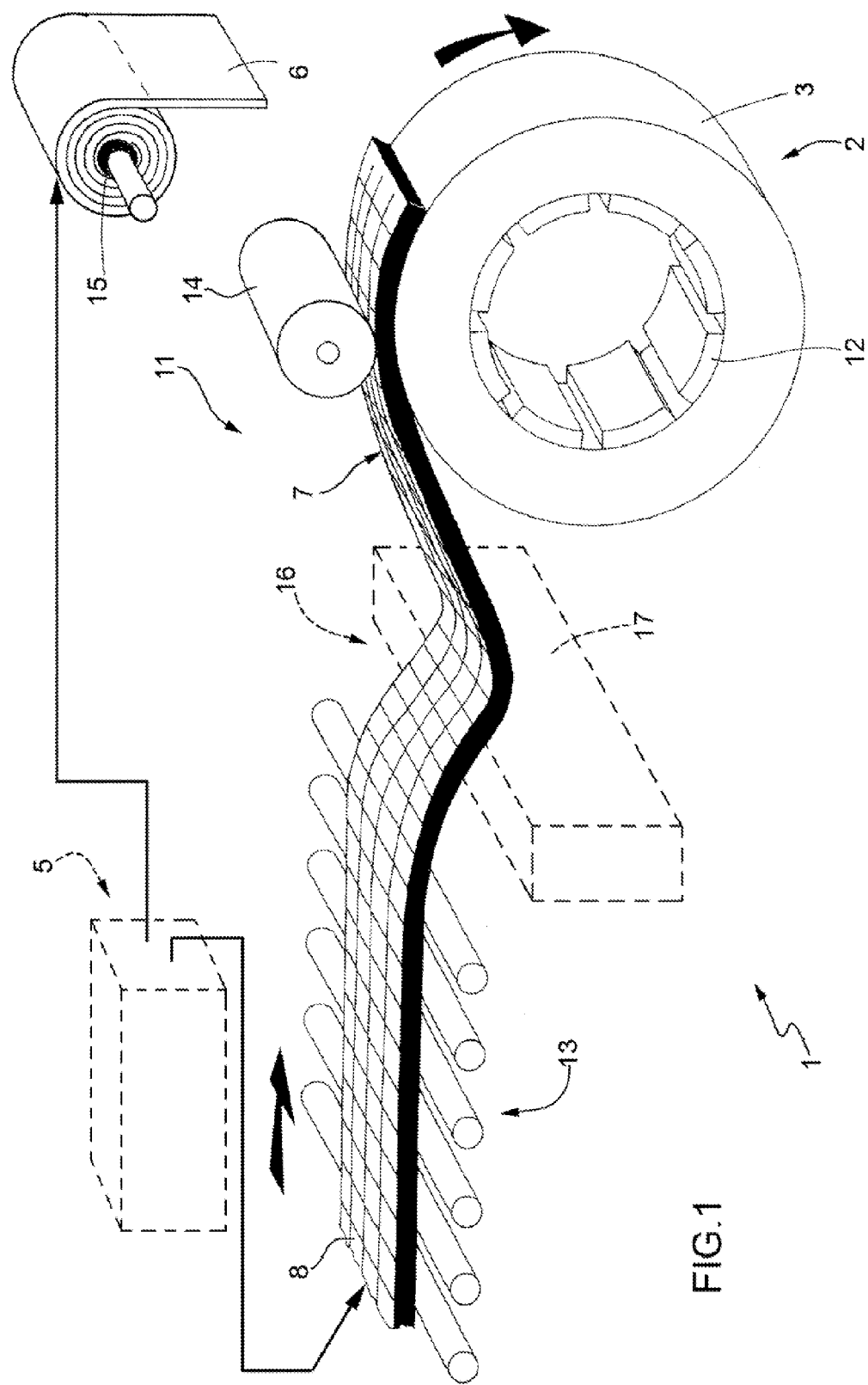
FIG. 1 shows a schematic, with parts removed for clarity, of a truck tyre cold retreading system in accordance with the present invention.

Number 1 in FIG. 1 indicates as a whole a retreading system for cold retreading a truck tyre 2. Retreading system 1 comprises a preparation station (not shown) where the worn tread is removed from tyre 2 to expose an underlying intermediate surface 3 of tyre 2, and the intermediate surface 3 is buffed, skived and filled.

The retreading system also comprises a work station (shown schematically) for extruding a green-rubber intermediate strip or cushion 6 with a substantially rectangular cross section, and a tread strip 7 (shown more clearly in FIG. 2) with a cross section of the same shape as the tread, and which is cured prior to use in retreading tyre 2. In other words, tread strip 7 is extruded, cut to the same length as the outer circumference of tyre 2, and then cured. A tread strip 7 of this sort is commonly known as a PCT (precured tread).

Figure 2:
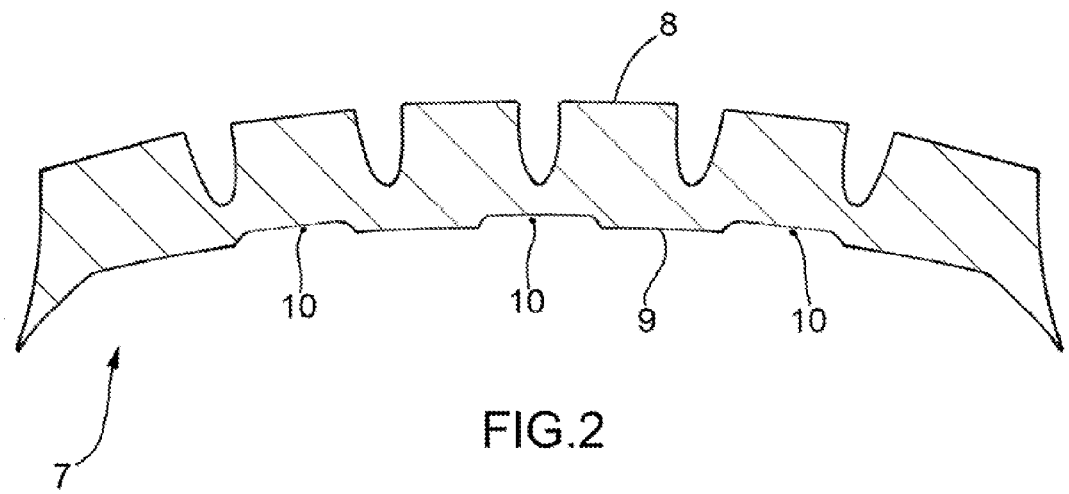
FIG. 2 shows a cross section of a tread strip employed in the FIG. 1 retreading system.

As shown in FIG. 2, tread strip 7 has an outer surface 8 which, when tread strip 7 is wound about tyre 2, is located on the outside and comprises the grooves and slits forming the tread pattern; and an inner surface 9 parallel to and opposite outer surface 8, and which, when tread strip 7 is wound about tyre 2, is located on the inside, contacting cushion 6.

On inner surface 9 (which faces cushion 6 when winding tread strip 7 about tyre 2), tread strip 7 has a number of longitudinal grooves 10 (three parallel longitudinal grooves 10 in the FIG. 2 embodiment), each of which has a roughly rectangular (to be exact, slightly trapezoidal) cross section elongated transversely (i.e. longitudinal groove 10 is much larger crosswise than in depth). Longitudinal grooves 10 are preferably formed when curing tread strip 7, using an appropriately shaped curing mold.

The embodiment in the attached drawings comprises three longitudinal grooves 10. Other embodiments not shown may comprise a different number of (e.g. one, two, four or more) grooves 10, and/or grooves 10 may be formed transversely or inclined at other than a 90° (e.g. 45°) angle to the longitudinal.

As shown in FIG. 1, retreading system 1 comprises a winding station 11 where green-rubber cushion 6 and tread strip 7 are wound about tyre 2 and onto intermediate surface 3. Winding station 11 comprises a rotary drum 12 supporting tyre 2; a feed conveyor 13 for feeding tread strip 7 to rotary drum 12; a pressure roller 14 resting on tread strip 7 between drum 12 and feed conveyor 13; and an actuating device (not shown) for pressing pressure roller 14 with adjustable force against tread strip 7. Winding station 11 may also comprise a support 15 for supporting in rotary manner a roll of green-rubber cushion 6, which is wound manually about tyre 2. In other words, feed conveyor 13 and support 15 define winding means for winding green-rubber cushion 6 about tyre 2, and winding tread strip 7 about tyre 2 and on top of green-rubber cushion 6.

In a preferred embodiment, winding station 11 is used to wind green-rubber cushion 6 manually about tyre 2 separately from tread strip 7, and is then used to wind tread strip 7 about tyre 2 and on top of the previously wound green-rubber cushion 6. In an alternative embodiment, green-rubber cushion 6 is applied (superimposed) onto tread strip 7 outside winding station 11 by a pair of mutually cooperating pressure rollers (not shown), and green-rubber cushion 6 and tread strip 7 are then wound together about tyre 2 at winding station 11.

Figure 3:
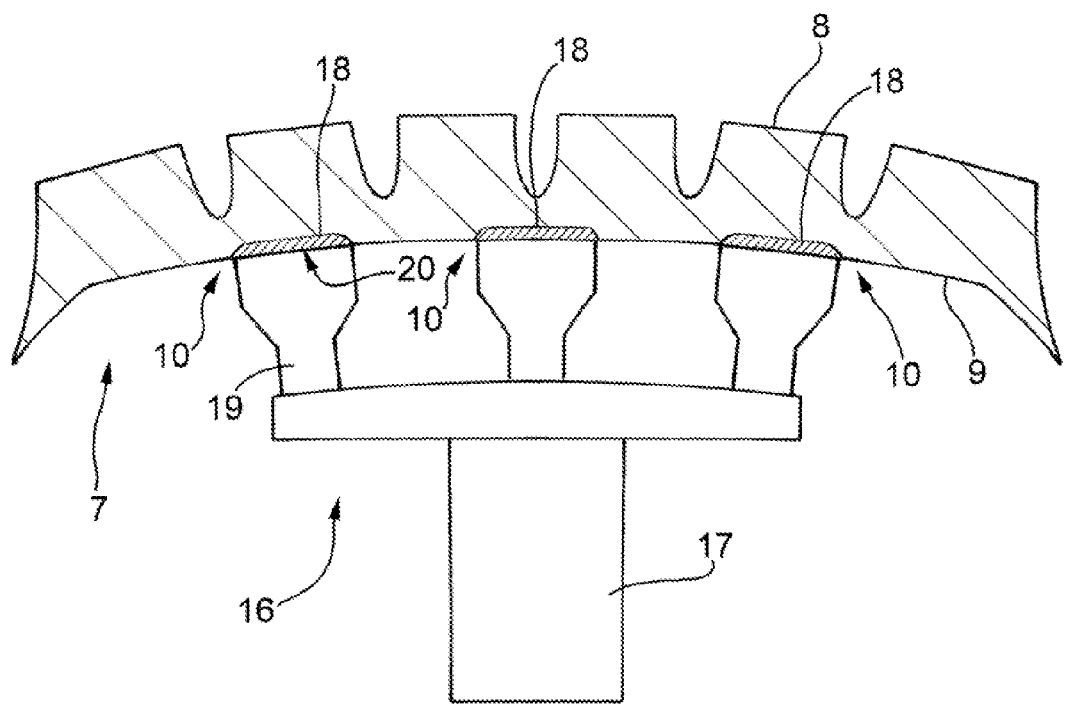
FIG. 3 shows a schematic of a green rubber application device of the FIG. 1 retreading system.

As shown in FIGS. 1 and 3, at an application station 16 preferably located along feed conveyor 13, upstream from drum 12, an application device 17 applies green-rubber strips 18 to the inner surface 9 of tread strip 7, each of which strips is inserted inside, to fill, a respective longitudinal groove 10. In other words, at application station 16, application device 17 feeds into each longitudinal groove 10 in tread strip 7 a respective green-rubber strip 18 of substantially the same shape and size as longitudinal groove 10, so as to fill longitudinal groove 10 completely with no overflow. In a preferred embodiment, green-rubber strips 18 are made of exactly the same type of green rubber as cushion 6.

Application device 17 preferably comprises, for each longitudinal groove 10 in tread strip 7, a corresponding extruder 19, which has an outlet 20 facing longitudinal groove 10, and extrudes respective green-rubber strip 18 directly into longitudinal groove 10. Green-rubber strips 18 are thus applied to longitudinal grooves 10 in tread strip 7 at relatively high temperature, normally ranging between 80° C. and 100° C., and which increases the grip of green-rubber strips 18. Obviously, the temperature of green-rubber strips 18 must not be too high (i.e. no higher than 100-110° C.), to avoid premature curing of the green rubber.

In the FIGS. 2 and 3 embodiment, each longitudinal groove 10 has a slightly trapezoidal cross section, with the minor base facing outer surface 8, and the major base facing inner surface 9. Alternatively, each longitudinal groove 10 has a slightly trapezoidal cross section, with the minor base facing inner surface 9, and the major base facing outer surface 8 (i.e. turned 180° with respect to FIGS. 2 and 3), so that each longitudinal groove 10 (and therefore corresponding green-rubber strip 18) negatively reproduces the shape of a "dovetail" joint which assists in holding respective green-rubber strip 18 in contact with tread strip 7.

Green-rubber strips 18 serve to improve grip of tread strip 7 to underlying cushion 6 when winding tread strip 7 about tyre 2 and on top of cushion 6 (regardless of whether tread strip 7 is wound about tyre 2 after green-rubber cushion 6, or green-rubber cushion 6 is applied to tread strip 7 before winding tread strip 7 about tyre 2). Green-rubber strips 18 ensure optimum grip of tread strip 7 to green-rubber cushion 6, to prevent detachment of tread strip 7 from green-rubber cushion 6 when winding tread strip 7 about tyre 2. In this connection, it is important to note the function of longitudinal grooves 10, which enable green-rubber strips 18 to be applied to tread strip 7 without locally increasing the thickness of tread strip 7 and so creating unacceptable unevenness.

Retreading system 1 also comprises a curing station (not shown) where tyre 2, complete with cushion 6 and tread strip 7, is cold cured. Tyre 2 is cold cured in a pressure vessel for a short length of time, since, tread strip 7 being precured, only green-rubber cushion 6 need be cured to ensure optimum grip of tread strip 7 to tyre 2 by the bonding action of cushion 6. In the case of hot retreading using a green-rubber tread strip 7, the curing station performs a hot curing process, in which tyre 2 is cured for a prolonged length of time in a press-sealed curing mold. That is, using a green-rubber tread strip 7 calls for hot curing to cure both cushion 6 and tread strip 7.

The retreading method described eliminates the need to cement the inner surface 9 of tread strip 7, while still ensuring optimum grip of tread strip 7 to green-rubber cushion 6 when winding tread strip 7 about tyre 2. Green-rubber strips 18 on inner surface 9 of tread strip 7, in fact, provide for greatly improving grip of tread strip 7 to green-rubber cushion 6. As stated, eliminating the cementing of inner surface 9 of tread strip 7 provides for greatly reducing both the cost and environmental impact of the retreading process.

The invention claimed is:

1. A method of retreading a tyre, comprising:
   removing the worn tread from the tyre to expose an underlying intermediate surface;
   buffing the intermediate surface of the tyre;
   winding a green-rubber cushion about the tyre and onto the intermediate surface;
   providing a pre-cured tread strip that has been cured prior to use in retreading the tyre, including:
      an outer surface which, when the pre-cured tread strip is wound around the tyre, is located on an outside, and comprises grooves and slits forming a tread pattern; and
      an inner surface parallel to and opposite the outer surface, and which, when the pre-cured tread strip is wound about the trye, is located on an inside, contacting the green-rubber cushion;
   forming at least one groove on the inner surface of the pre-cured tread strip;
   applying to the inner surface of the pre-cured tread strip, before winding the tread strip about the tyre and on top of the green-rubber cushion, a green-rubber strip that is separate and distinct from the green-rubber cushion, by inserting the green-rubber strip inside the groove on the inner surface so as to fill the groove, wherein the green-rubber strip is made of the same green rubber as the green-rubber cushion;
   winding, at a winding station, the pre-cured tread strip about the tyre and on top of the green-rubber cushion without any adhesive between the inner surface of the pre-cured tread strip and an outer surface of the green-rubber cushion, the green-rubber strip filling the groove so as to grip the pre-cured tread strip to the underlying green-rubber cushion and to prevent detachment of the pre-cured tread strip from the green-rubber cushion, and
   curing the tyre fitted with the green-rubber cushion and the pre-cured tread strip;
   wherein the green-rubber strip is extruded directly into the groove in the pre-cured tread strip so that the green-rubber strip is applied to the groove in the pre-cured tread strip at high temperature; and
   wherein the green-rubber strip is inserted inside the groove on the inner surface of the pre-cured tread strip at an application station located along a feed conveyor feeding the pre-cured tread strip to the winding station, immediately upstream from the winding station.

2. A method as claimed in claim 1, wherein the green-rubber strip is applied to the pre-cured groove in the tread strip at a high temperature ranging between 80° C. and 100° C.

3. A method as claimed in claim 1, wherein the green-rubber strip is applied to the inner surface of the pre-cured tread strip by an application device having an extruder with an outlet facing the groove.

4. A method as claimed in claim 1, wherein the groove is longitudinal.

5. A method as claimed in claim 4, wherein the longitudinal groove has a roughly rectangular cross section elongated transversely.

6. A method as claimed in claim 1, wherein the groove has a roughly rectangular cross section.

7. A method as claimed in claim 1, wherein the groove has a trapezoidal cross section with the minor base facing the inner surface, and the major base facing the outer surface.

8. A method as claimed in claim 1, wherein the groove has a trapezoidal cross section with the minor base facing the outer surface, and the major base facing the inner surface.

9. A method as claimed in claim 1, wherein the pre-cured tread strip comprises three parallel longitudinal grooves.

10. A method as claimed in claim 1, wherein the green-rubber strip is the same shape and size as the groove, so as to fill the groove completely without overflowing.

11. A method as claimed in claim 1, wherein the adhesive is cement.

\* \* \* \* \*